United States Patent
Mahmoud et al.

(10) Patent No.: US 11,421,143 B2
(45) Date of Patent: Aug. 23, 2022

(54) METHOD FOR REMOVING IRON SULFIDE AND CALCIUM CARBONATE SCALE

(71) Applicant: KING FAHD UNIVERSITY OF PETROLEUM AND MINERALS, Dhahran (SA)

(72) Inventors: Mohamed Mahmoud, Dhahran (SA); Salaheldin Elkatatny, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/133,153

(22) Filed: Sep. 17, 2018

(65) Prior Publication Data

US 2020/0087568 A1    Mar. 19, 2020

(51) Int. Cl.
*C09K 8/532*    (2006.01)

(52) U.S. Cl.
CPC .................... *C09K 8/532* (2013.01)

(58) Field of Classification Search
CPC .............................. C09K 8/528; C09K 8/532
See application file for complete search history.

(56) References Cited

U.S. PATENT DOCUMENTS

| | | | | |
|---|---|---|---|---|
| 6,926,836 B2* | 8/2005 | Fidoe | ................. | C23F 11/1676 |
| | | | | 422/15 |
| 8,673,834 B2* | 3/2014 | Trahan | ................. | C11D 7/06 |
| | | | | 510/222 |
| 2017/0198198 A1* | 7/2017 | Mahmoud | ............. | C09K 8/532 |
| 2018/0044571 A1 | 2/2018 | Jones et al. | | |
| 2018/0127638 A1 | 5/2018 | Thompson-Colón et al. | | |

FOREIGN PATENT DOCUMENTS

| | | |
|---|---|---|
| AU | 2014414832 B2 | 5/2018 |
| CN | 103789777 A | 5/2014 |
| WO | WO 2005/026065 A1 | 3/2005 |

OTHER PUBLICATIONS

Juliet Yap, et al., "Removing Iron Sulfide Scale: A Novel Approach", Society of Petroleum Engineers, https://www.onepetro.org/conference-paper/SPE-138520-MS, 2010, 2 pages (Abstract only).

* cited by examiner

*Primary Examiner* — Alicia Bland
(74) *Attorney, Agent, or Firm* — Oblon, McClelland, Maier & Neustadt, L.L.P.

(57) ABSTRACT

A method of removing a heterogeneous scale from a surface in fluid communication with a wellbore and/or subterranean formation comprising contacting the scale with a composition comprising tetrakis(hydroxmethyl)phosphonium sulfate (THPS) and N-(2-hydroxyethyl)ethylenediaminetriacetic acid (THEDTA) to dissolve the scale having a pH in the range of about 6.0 to 8.0. The composition is suitable to remove iron sulfide and calcium carbonate scale in the absence of corrosion resistance at a temperature up to about 150° C. Also, the composition may be used remove scale from surface pipe line and other petroleum oil handling equipment.

9 Claims, 1 Drawing Sheet

METHOD FOR REMOVING IRON SULFIDE AND CALCIUM CARBONATE SCALE

BACKGROUND OF THE INVENTION

Technical Field

The present disclosure relates to compositions and methods of removing iron sulfide and calcium carbonate scale deposits from surfaces in fluid communication with a wellbore and/or subterranean formation.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor impliedly admitted as prior art against the present invention.

Hydrogen sulfide, $H_2S$, is a contaminant of natural products such as oil, gas, and water, as well as a by product of many industries such as paper. The corrosive nature of $H_2S$ causes the accumulation of particulate iron sulfide as scale, especially in equipment used to recover and treat hydrocarbons from subterranean formations. Given the various chemical and physical conditions that lead into the formation of iron sulfide scales, several forms are found in a given section of a wellbore and/or corresponding pipelines including pyrrhotite ($Fe_7S_8$), troilite (FeS), marcasite ($FeS_2$), pyrite ($FeS_4$), greigite ($Fe_2S_4$), and mackinawite ($Fe_9S_8$).

It is seldom that a single type of iron sulfide scale is present. Generally, a mixture of different forms of iron sulfide scales are found entrained in hydrocarbons, glycol, salts, and the like to form scale deposits on the surfaces of conduits such as pipelines. In many oil fields, a heterogeneous mixture of iron sulfide scales and other scales including calcium carbonate scales are found, in particular, in oil fields associated with carbonate mineral formations. The scale adheres to the internal surfaces of a wellbore, pipeline networks, and associated equipment.

The physical appearance of the scale deposits varies from a viscous oil coated mass to a dry black powder. The buildup of scale deposits over time leads to a range of operational challenges at a wellbore's completion and production stages including inhibiting the performance of downhole tools, inducing formation damage, and plugging of downhole and surface equipment. The precipitation of scale near the wellbore can diminish the productivity of the well [Cord-Ruwisch et al. (1987) "Sulfate-reducing Bacteria and Their Activities in Oil Production" *Journal of Petroleum Technology* 39 (1): 97-106] and hinder the ability to inject water into the wells [Cusack et al. (1987) "Diagnosis and Removal of Microbial/Fines Plugging in Water Injection Wells" Paper SPE 16907 presented at the SPE Annual Technical Conference and Exhibition, 27-30 September, Dallas, Tex.; and Nasr-El-Din et al. (2001) Iron Sulfide Formation in Water Supply Wells with Gas Lift. Paper SPE 65028 presented at the SPE International Symposium on Oilfield Chemistry, 13-16 February, Houston; Nasr-El-Din et al. (2001) "Iron Sulfide Scale: Formation, Removal and Prevention" Paper SPE 68315 presented International Symposium on Oilfield. Scale, 30-31 January, Aberdeen, United Kingdom]. Also, the iron sulfide scale may block the flow of natural gas and oil by clogging or forming a thick lining in the production pipeline. It increases the corrosion rate of a pipeline network and interferes in the safe operation of pipeline valve systems which may lead to catastrophic system failures. In addition, the scale coats and damages wellbore equipment, such as heating turbines, heat exchangers, safety valves, casings, production tubing, mandrels, pipes, separators, and pumps.

Methods have been developed to decrease and remove iron sulfide scale deposits, including batch chemical cleaning continuous chemical cleaning, and mechanical scrubbing, such as milling, high pressure water, jetting, and sand blasting. The use of a strong acid, such as 10-20 wt % HCl, is the simplest way to dissolve iron, sulfide and/or calcium carbonate scales, however, it is ineffective in dissolving the pyrite ($FeS_2$) and marcasite ($FeS_2$) forms of the iron sulfide scales. Additionally, using a strong acid generates large amount of $H_2S$ gas, which is toxic and has a foul smell. Also, strong acids have corrosive effects on the wellbore equipment, and may damage the formation. Using an oxidizing agent may avoid such toxicity hazards, but produces oxidation products including elemental sulphur which is corrosive to pipes and other equipments. Acrolein may be used for treating scale, but it has health, safety, and environmental issues. Mechanical scrubbing, such as milling and water jetting with and without abrasives using pressures in excess of 140 MPa, generally requires that each pipe or piece of equipment is treated individually with significant levels of manual intervention. It is tune consuming, labor intensive, and frequently fails to remove all the scale. Mahmoud et al. [(2015) "Removal of Pyrite and Different Types of Ir Sulfide Scales in Oil and Gas Wells without $H_2S$ Generation" Paper IPTC 18279 presented at the International Petroleum Technology Conference held in Doha, Qatar, 7-9 December] introduced a new formulation that can remove pyrite iron sulfide scale from oil and gas wells. The tested scale was around 80% pyrite. DTPA was used as a chelating agent at pH 11 and potassium carbonate as a catalyst. The dissolving power reached 85 wt. % at 70° C. after two days. The optimum concentration of DTPA was 20 wt. % and the optimum concentration of the catalyst was around 6 wt. %. Wang et al. [(2015) "Laboratory assessment of tetrakis (hydroxymethyl) phosphonium sulfate as dissolver for scales formed in sour gas wells" Int. J. Corros. Scale Inhib., 2015, 4 (3) 235-254] used various formulations for iron sulfide scale removal. The scale samples consisted of pyrrhotite ($Fe_{1-x}S$, Mackinawite FeS, Pyrite $FeS_2$, Marcasite $FeS_2$, Calcite, Siderite, and Anhydrite. Different concentrations of tetrakis hydroxymethyl phosphonium sulfate (THPS) in the range of 15 to 75 wt. % were used for soaking time in the ranging of 1 hr. to 24 hrs. Also, Wang et al. investigated the effect of ammonium chloride salt on the scale dissolution process and found that 50 wt. % THPS yielded the highest removal efficiency. The problem with this formulation is the precipitation of calcium sulfate scales produced by the reaction of sulfate ions with calcium minerals from the scale or the reservoir rocks. U.S. Pat. No. 9,783,728 (Mahmoud et al., incorporated herein by reference in its entirety) discloses the use of chelating agents such as, but not limited to, DTPA, EDTA, GLDA, HEDTA with catalyst salts such as potassium carbonate ($K_2CO_3$), potassium formate (HCOOK), potassium hydroxide (KOH), potassium chloride (KCl), cesium formate (HCOOCs), and cesium chloride (CsCl) to enhance the removal of iron sulfide scales from oil and gas wells.

Although several methods were developed for the removal of iron sulfide scale from oil and gas wells, none of the methods considered the existence of calcium carbonate or carbonate scales within the iron sulfide scales. It is therefore the object of this invention to disclose a new composition comprising tetrakis(hydroxymethyl)phosphonium sulfate (THPS) and a chelating agent such as, but not limited to, N-(2-hydroxyethyl)ethylenediaminetriacetic acid (HEDTA) for the removal of both iron sulfide and calcium carbonate scales.

BRIEF SUMMARY OF THE INVENTION

According to a first aspect of the invention, the current disclosure is related to a composition comprising an amount of tetrakis(hydroxmethyl)phosphonium sulfate (THPS) in the range of 10 wt. % to 40 wt. % and one or more chelating agent selected from the group consisting of diethylenetriamine pentaacetic acid (DTPA), N-(2-hydroxyethyl)-ethylenediaminetriacetic acid (HEDTA), ethylenediaminetetraacetic acid (EDTA), N,N-bis(carboxymethyl)glutamic acid (GLDA), 1,2-cyclohexyldiaminetetraacetic acid (CDTA), N,N-bis(carboxymethyl)methylglycine (MGDA), and salts thereof in an amount in the range of 5 wt. % to 40 wt. %.

In a preferred embodiment, the composition has a pH in the range of about 6.0 to about 8.00.

In a more preferred embodiment, the composition has a pH of 6.5±0.3.

In another preferred embodiment, the composition further comprising at least one converting agent selected from the group consisting of potassium carbonate ($K_2CO_3$), potassium formate (HCOOK), potassium hydroxide (KOH), potassium chloride (KCl), cesium formate (HCOOCs), and cesium chloride (CsCl).

In another preferred embodiment, the chelating agent is HEDTA.

In another preferred embodiment, the amount of THPS is 25 wt. % and the amount of HEDTA is 15 wt. %.

In another preferred embodiment, the temperature of the composition is in the range of 70 to 180° C.

In a more preferred embodiment, the temperature of the composition is about 150° C.

In another preferred, the composition has no corrosion inhibitor.

A second aspect of the invention is directed to a method of removing scale from oil wells comprising:
  (a) injecting the composition of the invention into an oil well in need of scale removal, and
  (b) keeping the composition in the well for a time in the range of 12 hours to 96 hours.

In a preferred embodiment of the method, the composition does not contain corrosion inhibitor.

In another preferred embodiment of the method, the composition is heated to a temperature in the range of 70° C. to 180° C. prior to injection.

In a more preferred embodiment of the method, the composition is heated to about 150° C.

In another preferred of the method, the composition has no corrosion inhibitor.

In another preferred embodiment of the method, wherein the scale is a heterogeneous scale of iron sulfide and calcium carbonate.

In another preferred embodiment of the method, wherein the oil is contained in a sand stone or carbonate reservoir.

In another preferred embodiment of the method, the oil well permeability is increased compared to the well prior to injecting the composition.

A third aspect of the invention is directed to a method of removing scale from surface pipe line comprising treating a pipe line in need of scale removal with the composition of the invention for a time in the range of 12 hours to 96 hours.

In a preferred embodiment of the method, the composition has no corrosion inhibitor and is heated to a temperature in the range of 70 to 180° C.

In a more preferred embodiment of the method, the composition is heated to about 150° C.

A fourth aspect of the invention is directed to a method of removing scale from surface equipment comprising: treating surface equipment in need of scale removal with the of the invention a time the range of 12 hours to 96 hours.

In a preferred embodiment of the method, the composition has no corrosion inhibitor and is heated to a temperature in the range of 70 to 180° C.

In a more preferred embodiment of the method, the composition is heated to about 150° C.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
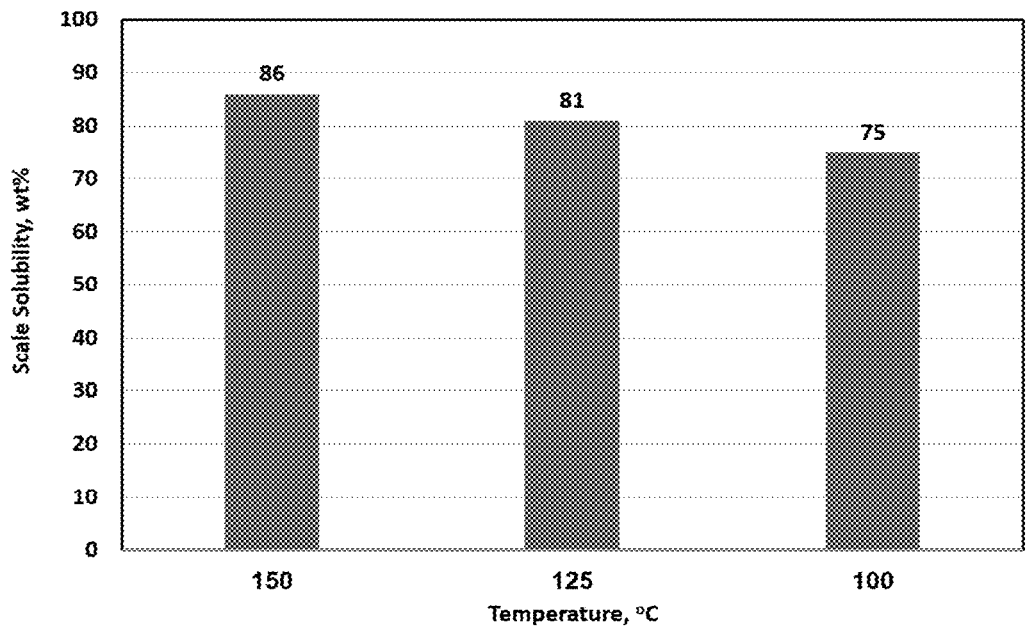
FIG. 1 shows the effect of temperature on the iron sulfide dissolution by a composition of 25 wt. % THPS and 15 wt. % HEDTA, pH 6.5.

Embodiments of the present disclosure will now be described more fully hereinafter with reference to the accompanying drawings, in which some, but not all embodiments of the disclosure are shown. The present disclosure will be better understood with reference to the following definitions.

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure. Also, the use of "or" means "and/or" unless stated otherwise. Similarly, "comprise" "comprises," "comprising" "include," "includes", and "including" are interchangeable and not intended to be limiting.

As used herein, the term "compound" is intended to refer to a chemical entity, whether in a solid, liquid or gaseous phase, and whether in a crude mixture or purified and isolated.

As used herein, the term "chelating agent" is intended to refer to a chemical compound or salt thereof having a molecular structure capable of enveloping and/or sequestering a certain type of ion, including iron and/or calcium cations, in a stable and preferably soluble complex.

As used herein, the term "converting agent" is intended to refer to a chemical that assists in the dissolution of the iron sulfide and/or calcium carbonate scale by converting an extremely insoluble iron sulfide salt, e.g. $FeS_2$ and $Fe_7S_8$, and/or calcium carbonate to a more soluble salt to increase the efficiency of sequestration of the scaling cations.

As used herein the term "corrosion inhibitor" refers to a substance(s) that prevents or reduces the deterioration of a metal surface by oxidation or other chemical reaction. Corrosive substances that can cause corrosion, particularly of metal surfaces used during the production, recovery, transportation and refining of hydrocarbons or various natural gases, include water with high salt contents, acidic inorganic compounds such as carbon dioxide ($CO_2$) or hydrogen sulfide ($H_2S$), natural organic acids, and microorganisms. Preferred corrosion inhibitor compositions of the present invention reduce, inhibit or prevent the destructive effect such substances have on various metal surfaces.

As used herein, the term "about" refers to an approximate number within 20% of a stated value, preferably within 15% of a stated value, more preferably within 10% of a stated value, and rgrost preferably within 5% of a stated value. For example, if a stated value is about 8.0, the value may vary in the range of 8±1.6, ±1.0, ±0.8, ±0.5, ±0.4, ±0.3, ±0.2, or ±0.1.

Disclosed herein are compositions and methods for removing an iron sulfide and calcium carbonate scale from a surface in fluid communication with a wellbore and/or subterranean formation as well as surface equipment used in transporting and processing fluids produced from a well.

In a first aspect the invention is related to a composition comprising an amount of tetrakis(hydroxmethyl)phosphonium sulfate (THPS) in the range of 10 wt. % to 40 wt. % and one or more chelating agents selected from the group consisting of diethylenetriamine pentacetic acid (DTPA), N-(2-hydroxyethyl)ethylenediaminetriacetic acid (HEDTA), ethylenediaminetetraacetic acid (EDTA), N,N-bis(carboxymethyl)glutamic acid (GLDA), 1,2-cyclohexyldiaminetetraacetic acid (CDTA), N,N-bis(carboxymethyl)methylglycine (MGDA), and salts thereof in an amount in the range of 5 wt. % to 40 wt. % where wt. % is based on the total weight of the composition.

The chelating agent may be in the free acid form or a salt thereof. The salt can be any soluble salt of the chelating agent such as but not limited to sodium, potassium, or ammonium salt. Also, the salt may be mono-, di-, tri- or tetrabasic salt, or combination thereof.

In a preferred embodiment, the composition has a pH in the range of about 6.0 to about 8.00, more preferably in the range of about 6.2 to about 7.00, and most preferably in the range of 6.4 to 6.7. In a particularly preferred embodiment, the pH of the composition is 6.5±0.3.

In another preferred embodiment, the composition contains an amount of THPS in the range of about 10 wt. % to about 40 wt. %, more preferably 20 wt. % to 30 wt. %, and most preferably in the range of about 23 wt. % to about 27 wt. %. In particularly preferred embodiment, the composition contains about 25 wt. % THPS.

In another preferred embodiment, the composition contains a chelating agent in the range of about 5 wt. % to about 40 wt. %, more preferably in the range of about 10 wt. % to about 20 wt. %, and most preferably in the range of about 12 wt. % to about 17 wt. %. In particularly preferred embodiment, the composition contains about 25 wt. % of the chelating agent.

In another preferred embodiment, the chelating agent is HEDTA.

In another preferred, the composition has no corrosion inhibitor. Many chemical compounds are known in the art as corrosion inhibitors. They are used routinely in the gas and petroleum industries to protect iron pipes and other equipment from corrosive gases associated with oil and gas such as $H_2S$. The corrosion inhibitors may include, but not limited to quaternary ammonium compounds, imidazolium salts, pyridinium salts, phosphate esters such as phosphate esters of mono-, di-, and trialkyl esters, and mono-, di-, and triethanolamine, fatty acids, alkoxyamines, and quaternary cationic polymers. Several U.S. patent and patent publications such as U.S. Pat. No. 3,909,447, incorporated herein by reference in its entirety; U.S. Pat. No. 5,456,767 incorporated herein by reference in its entirety; U.S. Pat. No. 5,863,767, incorporated herein by reference in its entirety; US20180201826 incorporated herein by reference in its entirety; and US20180163020 incorporated herein by reference in its entirety; describe the corrosion inhibitors and methods of their use.

In another preferred embodiment, the composition further comprising at least one converting agent selected from the group consisting of potassium carbonate ($K_2CO_3$), potassium formate (HCOOK), potassium hydroxide (KOH), potassium chloride (KCl), cesium formate (HCOOCs), and cesium chloride (CsCl). The amount of the converting agent may vary to optimize the solubilization of a particular heterogeneous scale. In a more referred embodiment, the amount of converting agent in the composition is in the range of about 2 wt. % to 20 wt. %, even more preferably in the range 5 wt. % to 15 wt. %, and most preferably in the range of 8 wt. % to 12 wt %.

In a second aspect the invention is directed to a method of removing iron sulfide and/or calcium carbonate scale from a wellbore and/or equipment associated therewith comprising contacting a heterogeneous iron sulfide and calcium carbonate scale present on a surface in fluid communication with the wellbore, equipment and/or subterranean formation with the composition described herein to dissolve and/or remove the iron sulfide and carbonate scale.

In a preferred embodiment, the heterogeneous scale comprises one or more iron sulfide scale such as but not limited to pyrrhotite ($Fe_7S_8$), a scale of troilite (FeS), a scale of marcasite ($FeS_2$), a scale of pyrite ($FeS_2$), a scale of greigite ($Fe_2S_4$), a scale of mackinawite ($Fe_9S_8$).

In a more preferred embodiment, the scale comprises iron sulfide and calcium carbonate or other alkaline earth carbonate such as beryllium, magnesium, strontium and barium.

In another preferred embodiment of the method, the composition is heated to a temperature in the range of 70 to 180° C., more preferably 100 to 160° C., and most preferably 140 to 160° C. In a particularly preferred embodiment, the composition is heated to about 150° C. when contacted with the scale.

The disclosed method can remove at least a portion of an iron sulfide and/or calcium carbonate scale from a surface in fluid communication with a wellbore and/or subterranean formation for the production of oil, gas, water, hot water or steam. The surface includes a natural surface such as, but not limited to, geological formation, oil and/or gas reservoir; or a surface of wellbore equipment and pipelines. Non-limiting examples of geological formations include sandstone, carbonate-containing formations, shale, or combinations thereof. Also contemplated is the removal of iron sulfide and/or calcium carbonate scale from any equipment in need of scale removal treatment. In a preferred embodiment, the method may be used for the removal of an iron sulfide and/or calcium carbonate deposits/accumulations or scale from a surface of the wellbore and/or subterranean formation. In another preferred embodiment, the method may be used for the removal of an iron sulfide or calcium carbonate scale from wellbore equipment such as, but not limited to, downhole equipment, surface equipment associated with the wellbore, and surfaces that are in fluid communication with the wellbore and/or subterranean formation. Non-limiting examples of wellbore equipment that may accumulate iron sulfide and/or calcium carbonate scale on one or more surfaces include heating turbines, heat exchangers, safety valves, casings, production tubing, mandrels, pipes, separators, pumps, tubulars, vessels, completion equipment including screens, downhole tools, and/or any other piece of equipment that is in contact with a wellbore product or service fluid.

A high or low power ultrasound may be used in conjunction with the disclosed method to increase the rate of dissolution of the iron sulfide and/or calcium carbonate scale by the composition disclosed herein. It may be a low or high frequency ultrasound. In a preferred embodiment, the frequency is in the range of about 1 to about 50 kHz, more preferably in the range of about 1 to about 30 kHz, and most preferably in the range of about 1 to about −20 kHz. The power of the ultrasound is in the range of about 1 to about 300 kW, preferably in the range of about 1 to about 200 kW, more preferably in the range of about 1 to about 100 kW, even more preferably in the range of about 1 to about 50 kW, and most preferably in the range of about 1 to about 25 kW, for a duration effective to remove or reduce the iron sulfide scale. The ultrasound treatment increases surface agitation and the contact of the composition in pores within the iron sulfide and calcium carbonate scale by creating a pressure wave which forces the composition in and out of the scale and prevents the composition from becoming saturated in the low mixing potential areas. The ultrasound may be delivered via a well sonication device, such as a QVI siren available from Quantum Vortex, Inc. (State College, Pa., USA). In general, the well may be flooded with the composition or other fluids containing the components of the composition and the ultrasound is deployed at the desired power and frequency.

The implementation of the method may vary depending on various considerations by one of ordinary skill in the art. In some instances, the method is implemented by introducing the composition to the wellbore and/or surrounding formation. In some other instances, the composition is applied to the wellbore and/or surrounding formation simultaneously with drilling fluids or muds, spacer fluids, lost circulation fluids, washing fluids, sweeping fluids, fracturing fluids, acidizing fluids, completion fluids, filter cake removal fluids, or cement slurries. In some instances, the composition is incorporated in the above mentioned fluids or slurries. In others, the composition is applied independently of the above mentioned fluids or slurries.

In a well drilling operation, a pumping system may be used to introduce and circulate the composition of the invention or a fluid containing the components of the composition down the drill string of the well to remove iron sulfide and/or calcium carbonate scale and/or prevent scale formation. The composition or the fluid then exits through the rotating drill bit and flows back to the surface via an annular space formed between the borehole wall and the drill string. In this situation, the composition or the fluid may also (a) provide support to the borehole wall and (b) prevent or, in case of under balanced drilling (UBD), control formation fluids or gasses from entering the well by the pressure of the composition or the fluid exerted against the wellbore inside wall. In some instances, the composition or the fluid containing the components of the composition is pumped into the wellbore at such a rate or pressure that the pressure of the composition or the fluid against the wellbore inside wall, termed the "fluid pressure" herein, does not exceed the formation fracture pressure or formation strength, whether the composition or the fluid is static or circulated during drilling operations. If the formation strength is exceeded, formation fractures will occur which will create drilling problems such as fluid losses and borehole instability. On the other hand, in overbalanced drilling, the fluid pressure in the well is always maintained above the pore pressure to avoid formation fluids entering the well. In contrast, the fluid pressure in the well is maintained just below the pore pressure to allow control over formation fluids entering the well during under balanced drilling. The injection pressure for the composition or the fluid containing the components of the composition is preferably in the range of 5,000 psi to 15,000 psi, or in a different range to maintain and keep the fluid pressure slightly below or above the pore pressure but not exceeding the formation strength. In some situation, it is desired to continuously circulate the composition or the fluid containing the components of the composition, whereas, in some others situation is alternately circulating and statically soaking the scale in the composition or the fluid containing the composition. The circulation rate, which affects the fluid pressure, can be adjusted along with the injection pressure to keep the fluid pressure slightly below or above the pore pressure, but not exceeding the formation strength.

The disclosed method may be utilized in conjunction with a formation evaluation operation such as electronically logging the wellbore. For example, the wellbore may be evaluated via electronic logging techniques following sufficient contact between the iron sulfide and/or calcium carbonate scale and the composition to remove all or a portion of the scale. The method of evaluating a formation utilizing the composition of the disclosed method may generally comprise circulating a drilling fluid during a drilling operation, and upon the cessation of drilling operations and/or upon reaching a desired depth, removing the iron sulfide and/or calcium carbonate scale deposits from a downhole surface utilizing the composition of the invention. Upon sufficient removal of the iron sulfide and/or calcium carbonate scale deposits, logging tools may be inserted into the wellbore to a sufficient depth to characterize a desired portion of the subterranean formation.

When desired, the wellbore or a portion thereof may be prepared for completion. Iron sulfide and/or calcium carbonate scale may have been deposited on equipment surfaces and formation surfaces and it would be highly desirable to remove the scale prior to the well production stage. Thus, the method of the invention is utilized to prepare the wellbore for completion and production. In such a method, the wellbore, or a portion thereof, may be completed by providing a casing string within the wellbore and cementing or otherwise securing the casing string within the wellbore. In such an embodiment, the casing string may be positioned (e.g., lowered) into the wellbore to a desired depth prior to, concurrent with, or following provision of the composition and/or removal of the iron sulfide and/or calcium carbonate scale deposit. When the iron sulfide scale and/or calcium carbonate scale has been sufficiently degraded and/or removed from the downhole surface, the composition may be displaced from the wellbore by pumping a flushing fluid, a spacer fluid, and/or a suitable cementitious slurry downward through an interior flowbore of the casing string and into an annular space formed by the casing string and the wellbore walls During production of water, steam, oil and/or gas from a well, iron sulfide and or calcium carbonate scale may be deposited on any of the surfaces that are in contact with the product. Since presence of the iron sulfide and/or calcium carbonate scale may slow down or completely stop production, it may be advantageous to perform scale removal operation. Accordingly, the composition of the disclosed invention is placed downhole during a production enhancement operation or service, where the composition is contacted with a downhole surfaces to remove all or a portion of scale therefrom and thereby increase the rate of production of the well.

The disclosed method may be used to prevent or lower risk of iron sulfide and/or calcium carbonate scale formation on various surfaces in fluid communication with a wellbore and/or subterranean formation, because of the ability of the composition to chelate and dissolved metal ions including the iron and calcium cations present in the wellbore environment.

In one embodiment, the disclosed method may be advantageously used for iron sulfide and or calcium carbonate scale removal operations in any suitable type of wellbore and its equipment. Non-limiting examples of wellbores suitable for this disclosure include those in an oil well, a gas well, a production well, an injection well, a naturally flowing well, an artificially lifted well, a high temperature well, a steam assisted gravity drainage well, a steam injector well, and a geothermal well.

The iron sulfide and/or calcium carbonate scale removal efficiency of the method is affected by several factors, including pH, temperature, chelating agent, the presence and identity of converting agent, the presence or absence of surfactants, and the composition and thickness of the iron sulfide and/or calcium carbonate scale, the composition and the pressure of the formation, the diameter of the hole, the contact time of the composition with the scale, and combinations thereof. For example, with the same well size and iron sulfide and/or calcium carbonate scale composition, the thicker the iron sulfide and/or calcium carbonate scale, the larger the amount and/or volume of the composition will be needed to dissolve the iron sulfide and/or calcium carbonate scale downhole, with the maximum volume of the composition being limited by the volume of the well. Thus, the effect of the scale thickness becomes more significant in a relatively small-sized well, since the ratio of the iron sulfide and/or calcium carbonate scale mass to the composition volume may more likely exceed the maximum solubility of the scale the composition. In such a case, it may be desirable to repeat the method until cost of the scale is removed.

The method of the invention removes at least about 50%, or preferably 70%, or more preferably at least about 80%, or even more preferably at least about 90%, or yet even more preferably at least 95%, or most preferably at least 99%, of the iron sulfide and/or carbonate scale from the surface in fluid communication with the wellbore and/or subterranean formation.

Ratio of the composition volume/the mass of the iron sulfide and/or calcium carbonate scale is at least about 30 ml/g, preferably at least about 50 ml/g, preferably at least about 75 ml/g, or preferably about at least 100 ml/g. Sufficient amount and/or volume of the composition that has been placed in contact with the iron sulfide and/or calcium carbonate scale may be allowed to remain in contact with the iron sulfide and/or calcium carbonate scale for a sufficient period of time such that the composition will remove all or a substantial portion of the iron sulfide and/or calcium carbonate scale from any surfaces where the iron sulfide scale and/or calcium carbonate night have been deposited. The composition may be allowed to remain in contact with the iron sulfide and/or calcium carbonate scale for a soak-period, for example, for a period of time of at, least about 1 hour, alternatively at least about 4 hours, alternatively at least about 8 hours, alternatively at least about 16 hours, alternatively at least about 24 hours, alternatively at least about 36 hours, alternatively at least about 48 hours, alternatively at least about 60 hours, alternatively at least about 72 hours, alternatively at least about 84 hours, or alternatively at least about 100 hours. During such a "soak period," the composition or a fluid containing the components of the composition within the wellbore and/or associated wellbore equipment may remain in a substantially static state, for example, as opposed to a dynamic state which circulation may be present. In some instances, the wellbore may be shut-in while the composition remains in contact with the iron sulfide and/or calcium carbonate scale deposits.

The composition used in the method may be modified by some additives such as, but not limited to, surfactant, aromatic organic solvents, emulsifier, and/or reducing agents.

The surfactant may function to improve the compatibility of the composition with other fluids that may be present in a subterranean formation and/or to enhance contact of the composition with one or more scaled surfaces. A surfactant may be used to enhance the reactivity of the composition by, for example, breaking any emulsions present from the drilling fluid system or improving the interfacial interactions between the iron sulfide and/or calcium carbonate scale and the composition thereby allowing the composition to have a direct contact with thee scale. Non-limiting examples of surfactants suitable for use in the composition include ethoxylated nonyl phenol phosphate esters, nonionic surfactants, cationic surfactants, anionic surfactants, amphoteric zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, betaines, modified betaines, alkylamidobetaines, cocamidopropyl betaine, quaternary ammonium compounds, trimethyltallowammonium chloride, trimethylcocoammonium chloride, or combinations thereof.

Commercial examples of surfactants that may be suitable for use in the present disclosure include without limitation CFS-485 casing cleaner, LOSURF-300M surfactant, LOSURF-357 surfactant, LOSURF-360 surfactant, LOSURF-400 surfactant, LOSURF-2000S surfactant, LOSURF-2000M surfactant, LOSURF-259 nonemulsifier, and NEA-96M surfactant. CFS-485 casing cleaner is a blend of surfactants and alcohols; LOSURF-300M surfactant is a nonionic surfactant; LOSURF-357 surfactant is a nonionic liquid surfactant; LOSURF-360 surfactant is a nonionic surfactant; LOSURF-400 surfactant is a nonemulsifier; LOSURF-2000S surfactant is a blend of an anionic non-emulsifer and an anionic hydrotrope; LOSURF-2000M surfactant is a solid surfactant; LOSURF-259 nonemulsifier is a nonionic, nonemulsfier blend; and NEA-96M surfactant is a general surfactant and nonemulsifier; all of which are available from Halliburton Energy Services, Inc.

Surfactants suitable for use in the present disclosure are described in more detail in U.S. Pat. No. 7,992,656, which is incorporated by reference herein in its entirety. In an embodiment, the surfactants may be present in the composition in an amount sufficient to prevent incompatibility with formation fluids or wellbore fluids. In some embodiments, where liquid surfactants are used, the surfactants may be present in an amount of from about 0.1 wt. % to about 5 wt. %, alternatively from about 0.5 wt. % to about 4 wt. %, or alternatively from about 1 wt. % to about 3 wt. %, based on the total weight of the composition. In other embodiments, where powdered surfactants are used, the surfactants may be present in an amount in the range of from about 0.01 wt. % to about 1 wt. %, alternatively from about 0.05 wt. % to about 0.5 wt. %, or alternatively from about 0.1 wt. % to about 0.3 wt. %, based on the total, weight of the composition. It may be beneficial to add a surfactant to the composition of the method as it is being pumped downhole, inter alia, to help reduce the possibility of forming emulsions with natural resources (e.g., oil) produced by the wellbore. In other instances, it may be beneficial to pretreat the surfaces of the iron sulfide scale deposits with a surfactant fluid before treating the surfaces with the composition (with or without the surfactants) of the disclosed method. In other instances, microemulsion additives optionally may be included in the composition. Non-limiting examples of emulsion-minimizing surfactants and microemulsion additives suitable for use in the present disclosure include PEN-88M surfactant, PEN-88HT surfactant, SSO-21E surfactant, SSO-21MW agent, and GASPERM 1000 service. PEN-88M surfactant is a nonionic penetrating surfactant; PEN-88HT surfactant is a high-temperature surfactant; SSD-21E surfactant is a foaming surfactant; SSO-21MW agent is a foaming surfactant and GASPERM 1000 service is a microemulsion; all, of which are commercially available from Halliburton Energy Services, Inc. Other additives such as corrosion inhibitors, clay control agents, lubricants, iron control agents, such as erythorbic acid and stannous chloride, that reduce $Fe^{3+}$ to $Fe^{2+}$ to avoid precipitation of iron (III) compounds, and the like may be optionally included in the composition.

In many instances, iron sulfide and/or calcium carbonate scales may be coated and/or commingled with solid or semisolid organic material which cannot be readily removed by the composition of the invention. For example, in oil and gas production wells and petroleum processing equipment, iron sulfide and/or calcium carbonate scale is coated with various organic materials such as oils, asphaltenes, paraffins, tars, greases, and the like. To obtain the full production capacity of wells, it is advantageous to dissolve the organic material to provide to have the composition of the method in a direct contact with the scale. In one embodiment, at least one aromatic solvent for removing the organic material is used prior to or subsequent to treating the iron sulfide scale with the composition of the invention. However, these multistage treatments can be costly, time consuming and sometimes ineffective, and may require consecutive rounds of treatments.

The composition of the method is an aqueous solution of THPS and one or more chelating agent may further comprises aromatic solvent in a dispersed phase and an effective amount of at least one emulsifier to form a stable emulsion for removal of solid or semisolid organic materials. Iron sulfide and/or calcium carbonate scales having occluded organic materials are treated with the emulsion to effectively remove both the iron sulfide and/or calcium carbonate scale and the organic material in a one-stage treatment. Non-limiting examples of the liquid aromatic solvent in the emulsion include both crude and refined toluene, benzene, xylene, and the like. Non-limiting examples of the emulsifier include polyamide emulsifiers having the formula $R^3O—C(O)—R^4—C(O)—N(R^1)—(CH_2)_n—NH—C(O)—R^2$ (where $R^1$ and $R^2$ are independently selected from $C_{10}$-$C_{24}$ alkylene groups, $R^3$ is a hydrogen or a $C_1$-$C_5$ alkyl group. $R^4$ is a $C_1$-$C_5$alkyl/alkene group, and n is an integer of from 2-5) and typically used at a concentration of 0.5-1.5% of the total weight of the emulsion, as disclosed in U.S. Pat. No. 8,163,675B2, which is incorporated herein by reference in its entirety; a phosphate ester of an ethoxylated straight chain alcohol containing 8 to 10 carbon atoms and containing ethylene oxide in reacted form at a 4:1 or greater molar ratio, preferably at a 6:1 or greater molar ratio, preferably at an 8:1 or greater molar ratio, or preferably at a 10:1 or greater molar ratio, relative to the straight chain alcohol, and typically used at a concentration of 0.5-5% of the total volume of the emulsion; and a phosphate ester of an ethoxylated tridecyl alcohol containing ethylene oxide in reacted form at a 6:1 or greater molar ratio, preferably at an 8:1 or greater molar ratio, or preferably at a 10:1 or greater molar ratio, relative to the tridecyl alcohol, and typically used at a concentration of 0.5-5% of the total volume of the emulsion.

U.S. Pat. No. 6,006,831, which is incorporated herein by reference in its entirety, describes additional emulsifiers that may also be suitable for the composition of the present disclosure. They include fatty acids, soaps of fatty acids (e.g., calcium soaps), and fatty acid derivatives including amidoamines, polyamides, polyamines, sulfonates, triglycerides, esters (such as sorbitan monoleate polyethoxylate, sorbitan dioleate polyethoxylate), imidazolines, alcohols and combination derivatives of the above. The fatty acid soaps can be formed in situ by the addition of the desired fatty acid and a base, preferably lime. The above emulsifiers are generally used in amounts of about 0.4-2.5 g/100 ml of the emulsion fluid.

The emulsion can be prepared having an aqueous phase to aromatic phase volume proportion ranging from about 90:10 to about 40:60, preferably from about 80:20 to about 50:50, or preferably from about 70:30 to about 60:40.

Since $Fe^{2+}$ salts are more soluble in aqueous solution than $Fe^{3+}$. It may be desirable to add one or more reducing agent to the composition of the method to reduce $Fe^{3+}$ to $Fe^{2+}$ and thereby increasing the efficacy of the composition in removing iron sulfide and calcium carbonate scale. Examples of the reducing agents include, but not limited to erythorbic acid, ascorbic acid, and stannous chloride. While the amount of the reducing agent may vary depending on the composition of the scale, it is recommended to add erythorbic acid or ascorbic acid may be used at a concentration of 2400 mg/l to be effective, see U.S. Pat. No. 4,574,050, which is incorporated herein by reference in its entirety.

The composition of the disclosed method may be disposed of, such as by re-injection into the subterranean formation once the chelating agent(s) of the composition become saturated with iron and/or calcium cations from the scale. Since a large volume of the composition is often needed to remove scale deposits and the reagent cost in the composition may be high, it may be advantageous to reclaim and reuse the chelating agent(s) from the spent composition. Thus, the method of the present disclosure may further comprise acidifying the composition containing the dissolved scale to form a precipitant one insoluble iron and/or calcium salt, and separating the precipitant from the composition comprising at least one free chelating agents. Once the metal ions are separated from the chelating agent(s), the chelating agents) may be reused.

As the pH is reduced, the availability of anions with which the sequestered cations, e.g. $Ca^{2+}$, $Fe^{2+}$, and $Fe^{3+}$, may be released from the chelated complex to form one or more insoluble iron and/or calcium salts that will precipitate out of the composition. Also, adjusting the pH of the spent composition to the isoelectric point of the chelating agent may cause the chelating agent(s) to precipitate out of the composition as zwitterion. Since iron (III) compounds are generally more insoluble than iron (II) compounds even in an acidic solution, to reduce the mass of the insoluble iron salt(s) and facilitate the recover of the chelating agent(s), prior to or concurrent with the acidification, on or more iron reducing agents, such as erythorbic acid, ascorbic acid, and stannous chloride, may be optionally added to the spent composition to reduce $Fe^{3+}$ being released from the chelated complex to $Fe^{2+}$, the salt(s) of which will more likely remain in the soluble fraction of the composition and separate from the precipitate of the chelating agent(s). According to U.S. Pat. No. 4,574,050, which is incorporated herein by reference in its entirety, erythorbic acid or ascorbic acid may be used at a concentration of 2400 mg/l to be effective. Additionally, at least one hydrogen sulfide scavenger may also be added to make the sulfide unavailable for re-formation and/or re-precipitation of ferric sulfide and ferrous sulfide. Non-limiting examples of suitable hydrogen sulfide scavengers include a reaction product of glyoxal and a polyamine disclosed in US Patent Application No. US20120329930 A1 (incorporated herein by reference in its entirety), a functionalized alpha-hydroxy alkyl ether disclosed in US Patent Application No. US20140166282 A1 (incorporated herein by reference in its entirety), and a polyaliphatic amine having the formula $H_2NRNH-(RNH)n-H$ I, wherein R is an aliphatic radical and n is from about 0 to about 15, disclosed in US Patent Application No. US2009/033995 (incorporated herein by reference in its entirety), etc.

The precipitated chelating agent(s) and iron salt(s) may then be isolated from the remainder of the composition. Isolation of the precipitants may be performed by filtering the solids or decanting the solution off the solids, or siphoning, for example. Once isolated from the remainder of the composition, the solids may be formulated to another composition for removal of iron sulfide and/or calcium carbonate scale.

A third aspect of the invention is directed to a method of removing iron sulfide and/or calcium carbonate scale from surface pipeline comprising treating a pipeline in need of scale removal with the composition of the invention for a time in the range of 12 hours to 96 hours. The pipelines are any type of pipelines of any length or diameter in need of scale removal including but not limited to water pipelines, natural gas pipe lines, and petroleum oil pipe lines. The composition of the invention may be heated to a temperature in the range of 70 to 180° C., preferably in the range of 100 to 160° C., more preferably in the range of 140 to 155° C. In a particularly, preferred embodiment the composition is heated to about 150° C. One advantage of the method composition is that there is no need to add corrosion inhibitor even when the composition is heated up to 150° C. Clue or more additives may be added to the composition of the method to improve its efficiency for removing iron sulfide and/or calcium carbonate scale from pipes which are mentioned above including but not limited to surfactants; iron salts reducing agent; aromatic organic solvents, and reducing agents which are able to reduce $Fe^{3+}$ to $Fe^{2+}$.

A fourth aspect of the invention is directed to a method of removing scale from surface equipment comprising: treating surface equipment in need of scale removal with compositions of the invention for a time in the range of 12 hours to 96 hours. The surface equipment may be any equipment used in transporting and processing crude oil such as, but not limited to pumps, both tanker trucks and ships, oil refinery, and oil storage facilities. A preferred embodiment of the method, the composition of the method has no corrosion inhibitor and is heated to a temperature in the range of 70 to 180° C., preferably in the range of 100 to 160° C. more preferably in the range of 140 to 155° C. In a particularly, preferred embodiment the composition is heated to about 150° C. One or more additives may be added to the composition of the method to improve its efficiency for removing iron sulfide and/or calcium carbonate scale from pipes which are mentioned above including but not limited to surfactants, iron salts reducing agent; aromatic organic solvents, and reducing agents which are able to reduce $Fe_{3+}$ to $Fe^{2+}$.

Having generally described this invention, a further understanding can be obtained by reference to certain specific examples which are provided herein for purposes of illustration only and are not intended to be limiting unless otherwise specified.

EXAMPLE 1

Materials and Methods:

Thermal stability experiments were conducted at high pressure-high temperature (HPHT) in a see-through-cell for 24 hours at temperatures up to 150° C. The pH of all formulations was 6.5 to reduce the corrosion of the well tubulars. Static corrosion tests were carried out at different temperature for 6 hours using HPHT autoclave reactor. The pressure was maintained at 1500 psi using a mixture of 10% $CO_2$, 10% $H_2S$, and 80% $N_2$. Corrosion tests were performed using tubing and casing coupons. The corrosion rate was determined by measuring the weight of the coupons before and after the test. Static and dynamic solubility experiments were carried at HPHT autoclave reactor using scale samples for different soaking periods. The effects of fluids concentration and pH were investigated on the scale solubility. The tested iron, sulfide samples consist of 20 wt. % calcite, 40 wt. % pyrite ($FeS_2$), and 40 wt. % pyhrottite (FeS). Also, core-flooding experiments were performed using THPS and combined THPS/HEDTA chelating agent, using carbonate rock samples.

EXAMPLE 2

Core-Flooding Experiments:

Two Indiana limestone cores were used to investigate the compatibility of the introduced formulation with the reservoir rock. The cores properties before and after core-flooding are listed in Table 1. The first formulation, 25 wt. % THPS caused damage to the core because the reaction of THPS with calcium carbonate from the rock precipitated calcium sulfate scale crustal that plugged the core pore throat and reduced the permeability. The second formulation contained 25 wt. % THPS and 15 wt. % HEDTA, enhanced the core permeability from 65 to 85 md, which means no scale precipitations occurred in this case. HEDTA chelating agent prevented the precipitation of calcium sulfate because it chelated the calcium from the rock and solution and prevented its interaction with THPS. From these two experiments, we can conclude that THPS/HEDTA formulation is safe to remove iron sulfide scale from the rock samples and also from the tubing without the risk of precipitating calcium sulfate scale.

TABLE 1

Core and Fluid Properties

| Core | Fluid composition | Initial Permeability mD | Final Permeability mD | Permeability ratio |
|---|---|---|---|---|
| 1 | 25 wt. % THPS | 70 | 5 | 0.07 |
| 2 | 25 wt. % THPS and 15% wt. % HEDTA | 65 | 85 | 1.23 |

Iron sulfide scale was precipitated in the rock sample by injecting liquid sulfur along with ferric chloride inside two Indiana limestone cores with high permeability and the properties of coreflooding are listed in Table 2. $K_1$ represents the initial core permeability, md (millidarcy), $K_2$ represents the core permeability after FES (iron sulfide) deposition inside the core, md, and $K_3$ represents the permeability of the core after scale removal. A composition of 25 wt. % THPS was injected into core 3 and a composition of 25 wt. % THPS and 15 wt. % HEDTA was injected into core 4 to remove the iron sulfide scale. It is clear that the composition of 25 wt. % THPS damaged the core and reduced the permeability more from 30 md after iron sulfide deposition to 15 md after injecting THPS. In contrast, injecting a composition comprising THPS and HEDTA restored the core permeability and removed the precipitated iron sulfide along with some calcite. The core permeability increased from 25 to 156 md. The same procedure was followed for core 5, Berea sandstone core, and the results were similar to that in Indiana limestone cores.

TABLE 2

Core and Fluid Properties

| Core | $K_1$, md | $K_2$, md | $K_3$, md |
|---|---|---|---|
| 3 | 120 | 30 | 15 |
| 4 | 106 | 25 | 156 |
| 5 | 95 | 45 | 102 |

EXAMPLE 3

Figure 2:
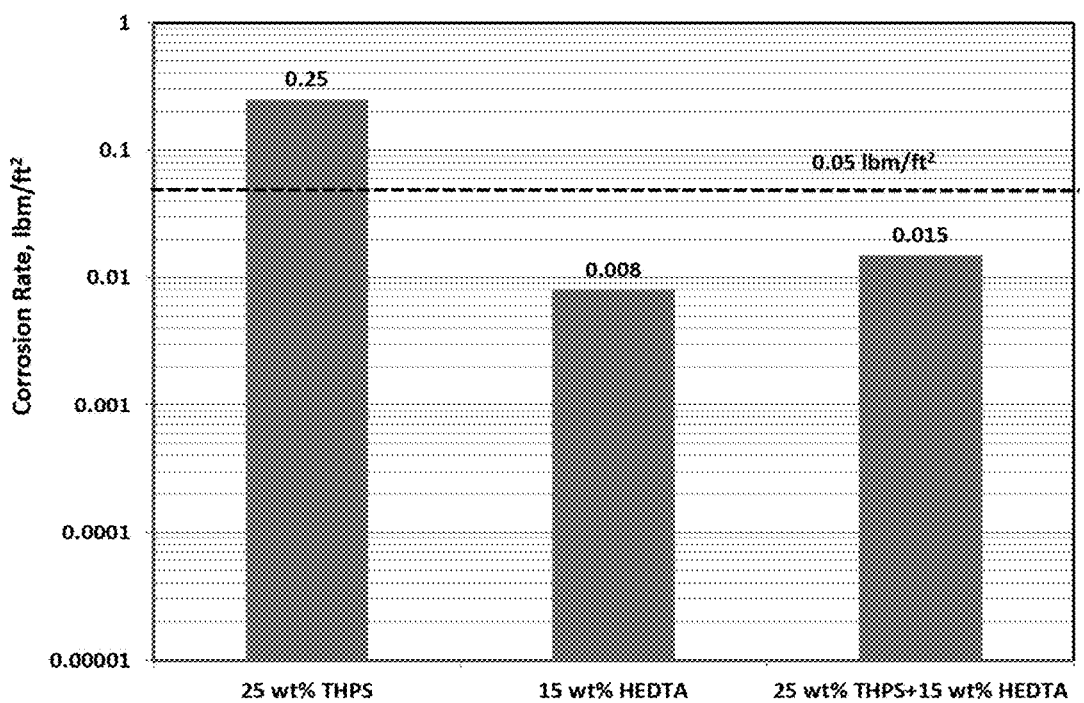
FIG. 2 shows the corrosion results of a composition containing 25 wt. % THPS and 15 wt. % HEDTA, pH 6.5, at 150° C. The formulation is not corrosive at 150° C. without adding corrosion inhibitors to THPS which is very corrosive.

Scale Removal Experiments:

Scale solubility was performed at using different combinations of THPS and HEDTA chelating agent. Concentrations from 10 to 30 wt. % of each THPS and HEDTA were tested and the optimum concentrations of the composition tested on scale sample contains 25 wt. % THPS and 15 wt. % HEDTA. Table 3 shows the solubility results for different composition comprising varying amount of THPS and HEDTA at 150° C. The test duration was 24 hours. Very little increase in scale solubility was observed after 24 hrs. Also, the optimum formulation was tested at 100 and 125° C. and the results are shown in FIG. 1. Increasing the temperature enhanced the dissolution of iron sulfide scale, which gives an option of heating the fluid under pressure at the surface to expedite the scale removal process in the field. FIG. 2 shows the corrosion results at 150° C. in the absence of corrosion inhibitor indicating the optimal composition is not corrosive at 150° C. without adding corrosion inhibitors compared to THPS. The optimum formulation was tested for corrosion for 6 hours using autoclave cell at 1500 psi under a mixture of 10% $H_2S$, 10% $CO_2$, and 80% $N_2$.

TABLE 3

Scale-Solubility Results

| No. | Formulation | pH | Solubility, wt. % |
|---|---|---|---|
| 1 | 30 wt. % THPS | 3.5 | 40 |
| 2 | 25 wt. % THPS | 3.5 | 45 |
| 3 | 20 wt. % THPS | 3.5 | 42 |
| 4 | 15 wt. % THPS | 3.5 | 40 |
| 5 | 10 wt. % THPS | 3.5 | 30 |
| 6 | 10 wt. % HEDTA | 11 | 30 |
| 7 | 15 wt. % HEDTA | 11 | 35 |
| 8 | 20 wt. % HEDTA | 11 | 40 |
| 9 | 25 wt. % HEDTA | 11 | 45 |
| 10 | 30 wt. % HEDTA | 11 | 42 |
| 11 | 30 wt. % HEDTA and 30 wt. % THPS | 7.5 | 60 |
| 12 | 30 wt. % HEDTA and 25 wt. % THPS | 7.0 | 65 |
| 13 | 10 wt. % HEDTA and 25 wt. % THPS | 6.5 | 70 |
| 14 | 20 wt. % HEDTA and 20 wt. % THPS | 6.7 | 72 |
| 15 | 15 wt. % HEDTA and 25 wt. % THPS | 6.5 | 86 |

The invention claimed is:

1. A composition, comprising:
   an amount of tetrakis(hydroxmethyl)-phosphonium sulfate (THPS) in the range of 10 wt. % to 40 wt. %, and N-(2-hydroxyethyl)ethylenediaminetriacetic acid (HEDTA) in an amount in the range of 5 wt. % to 40%, wherein wt. % is based on the total weight of the composition,
   wherein the composition has pH in the range of about 6.0 to about 8.0.

2. The composition of claim 1, wherein the composition has a pH of 6.5±0.3.

3. The composition of claim 1, wherein the composition further comprises at least one converting agent selected from the group consisting of potassium carbonate ($K_2CO_3$), potassium formate (HCOOK), potassium hydroxide (KOH), potassium chloride (KCl), cesium formate (HCOOCs), and cesium chloride (CsCl).

4. The composition of claim 1, wherein the composition has no corrosion inhibitor.

5. The composition of claim 1, wherein the amount of THPS is 25 wt. % and the amount of HEDTA is 15 wt. %.

6. The composition of claim 5, wherein the composition has a pH of 6.5±0.3.

7. The composition of claim 1, wherein the composition has a pH of 6.5-7.2.

8. The composition of claim 3, wherein the composition has a pH of about 6.5.

9. The composition of claim 8, wherein the composition has no corrosion inhibitor.

* * * * *